United States Patent
Kozhaya et al.

(10) Patent No.: US 12,052,260 B2
(45) Date of Patent: Jul. 30, 2024

(54) SCALABLE AND DYNAMIC TRANSFER LEARNING MECHANISM

(71) Applicant: International Business Machines Corporation, Armonk, NY (US)

(72) Inventors: Joseph Kozhaya, Morrisville, NC (US); Shikhar Kwatra, Durham, NC (US); Sourav Mazumder, Contra Costa, CA (US)

(73) Assignee: International Business Machines Corporation, Armonk, NY (US)

(*) Notice: Subject to any disclaimer, the term of this patent is extended or adjusted under 35 U.S.C. 154(b) by 938 days.

(21) Appl. No.: 16/587,121

(22) Filed: Sep. 30, 2019

(65) Prior Publication Data

US 2021/0097428 A1 Apr. 1, 2021

(51) Int. Cl.
*H04L 9/40* (2022.01)
*G06F 3/0481* (2022.01)
(Continued)

(52) U.S. Cl.
CPC .......... *H04L 63/104* (2013.01); *G06F 3/0481* (2013.01); *G06F 18/214* (2023.01);
(Continued)

(58) Field of Classification Search
CPC .... G06F 21/554; G06F 12/023; G06F 3/0481; G06F 3/0482; G06F 3/04883; G06N 20/00; G06N 3/08; G06N 3/088; G06N 5/02; G06T 9/002; G06T 15/005; G06T 11/60; H04L 63/1416; H04L 63/104; H04L 12/12; H04L 67/34; H04L 41/0213; H04L 67/12;
(Continued)

(56) References Cited

U.S. PATENT DOCUMENTS 9,503,466 B2 11/2016 Vasseur et al.
9,888,073 B2 2/2018 Ohana et al.
(Continued)

FOREIGN PATENT DOCUMENTS

CN 112580814 A 3/2021

OTHER PUBLICATIONS

Tao et al., "eSGD: Communication Efficient Distributed Deep Learning on the Edge," HotEdge '18, USENIX Workshop on Hot Topics in Edge Computing, Jul. 2018, 6 pages.
(Continued)

*Primary Examiner* — Kyung H Shin
(74) *Attorney, Agent, or Firm* — Jared C. Chaney (57) ABSTRACT

A computer-implemented method for adapting a deep learning model to a local environment includes collecting training data; training a common deep learning model using the collected training data; customizing the deep learning model based on characteristics specific to one of a plurality of local devices utilizing transfer learning; and deploying the customized deep learning model to the one of the plurality of local devices. The customized deep learning model may be trained across a hierarchy comprising: a central common model trained on data from all devices in the plurality of devices; a location based model trained on a first set of data from devices in the plurality of devices within a location proximity; and a device based model trained on a data from one device in the plurality of devices.

20 Claims, 8 Drawing Sheets

(51) Int. Cl.

| | |
|---|---|
| *G06F 18/214* | (2023.01) |
| *G06F 18/232* | (2023.01) |
| *G06N 3/08* | (2023.01) |
| *G06N 20/00* | (2019.01) |
| *G06Q 20/40* | (2012.01) |
| *G06T 9/00* | (2006.01) |

(52) U.S. Cl.
CPC ............. *G06F 18/232* (2023.01); *G06N 3/08* (2013.01); *G06N 20/00* (2019.01); *G06Q 20/4014* (2013.01); *G06T 9/002* (2013.01); *H04L 63/1416* (2013.01)

(58) Field of Classification Search
CPC . G06Q 20/4014; G06Q 20/1085; G01S 19/13
See application file for complete search history.

(56) References Cited

U.S. PATENT DOCUMENTS

| | | | |
|---|---|---|---|
| 9,990,587 | B2 | 6/2018 | Okanohara et al. |
| 10,007,513 | B2 | 6/2018 | Malladi et al. |
| 10,713,632 | B1* | 7/2020 | Shah .................. G06Q 20/4014 |
| 2004/0217947 | A1* | 11/2004 | Fitzmaurice .......... G06F 3/0481 |
| | | | 345/181 |
| 2016/0217387 | A1 | 7/2016 | Okanohara et al. |
| 2017/0116520 | A1 | 4/2017 | Min et al. |
| 2018/0114334 | A1 | 4/2018 | Desai et al. |
| 2018/0197111 | A1 | 7/2018 | Crabtree et al. |
| 2018/0240011 | A1 | 8/2018 | Tan et al. |
| 2018/0286409 | A1 | 10/2018 | Baughman et al. |
| 2019/0036716 | A1* | 1/2019 | Kasaragod ............ H04L 63/104 |
| 2019/0042937 | A1 | 2/2019 | Sheller et al. |
| 2019/0050683 | A1 | 2/2019 | Gupta Hyde et al. |
| 2019/0079898 | A1 | 3/2019 | Xiong et al. |
| 2019/0114543 | A1 | 4/2019 | Chen et al. |
| 2019/0156194 | A1 | 5/2019 | Burr |
| 2019/0156246 | A1 | 5/2019 | Kuo et al. |
| 2019/0206090 | A1* | 7/2019 | Ray ......................... G06T 9/002 |
| 2020/0045066 | A1* | 2/2020 | Meng .................. H04L 63/1416 |
| 2021/0073377 | A1* | 3/2021 | Coull .................... G06F 21/554 |

OTHER PUBLICATIONS

Zhou et al., "Edge Intelligence: Paving the Last Mile of Artificial Intelligence with Edge Computing," arXiv:1905.10083v1, Cornell University, May 24, 2019, pp. 1-24.
Chen et al., "Data-driven Task Allocation for Multi-task Transfer Learning on the Edge," EasyChair Preprint No. 1269, Jul. 6, 2019, 11 pages.
Wang et al., "Adaptive Federated Learning in Resource Constrained Edge Computing Systems," arXiv:1804.05271v3, Cornell Unviersiy, Feb. 17, 2019, pp. 1-20.
Huang et al., "When Deep Learning Meets Edge Computing," 2017 IEEE 25th International Conference on Network Protocols (ICNP), Oct. 2017, pp. 1-2, IEEE. DOI: 10.1109/ICNP.2017.8117585.
Yang et al., "Federated Machine Learning: Concepts and Applications," arXiv:1902.04885v1, Cornell University, Feb. 13, 2019, 19 pages. (ACM Trans. Intell. Syst. Technol., vol. 10, No. 2, Article 12, Feb. 2019).
Mell et al., "The NIST Definition of Cloud Computing," Recommendations of the National Institute of Standards and Technology, U.S. Department of Commerce, Special Publication 800-145, Sep. 2011, 7 pages.
Chu et al., "Feature Importance Identification in Deep Learning Models," U.S. Appl. No. 16/394,006, filed Apr. 25, 2019.
Bhattacharjee et al., "Peer Assisted Distributed Architecture for Training Machine Learning Models," U.S. Appl. No. 16/386,561, filed Apr. 17, 2019.
Sarkar, "A Comprehensive Hands-on Guide to Transfer Learning with Real-World Applications in Deep Learning," Deep Learning on Steroids with the Power of Knowledge Transfer!, Nov. 14, 2018, 98 pages. https://towardsdatascience.com/a-comprehensive-hands-on-guide-to-transfer-learning-with-real-world-applications-in-deep-learning-212bf3b2f27a.

* cited by examiner

SCALABLE AND DYNAMIC TRANSFER LEARNING MECHANISM

BACKGROUND

The subject disclosure relates to artificial intelligence (AI) powered solutions, and in particular, to training AI models.

AI powered solutions are becoming ubiquitous in our everyday life. Whether it is a virtual assistant on a device, an image captioning solution on a social media platform, or a movie recommendation engine on TV, people experience AI in much of our daily interactions.

SUMMARY

According to one or more embodiments, a method for adapting a deep learning model to a local environment comprising: collecting training data; training a common deep learning model using the collected training data; customizing the deep learning model based on characteristics specific to one of a plurality of local devices utilizing transfer learning; and deploying the customized deep learning model to the one of the plurality of local devices. The customized deep learning model may be trained across a hierarchy comprising: a central common model trained on data from all devices in the plurality of devices; a location based model trained on a first set of data from devices in the plurality of devices within a location proximity; and a device based model trained on a data from one device in the plurality of devices. The training data may be collected from the plurality of local devices; and the customization may be based at least in part on data collected from the one of the plurality of local devices.

According to one or more embodiments, a computer system for adapting a deep learning model to a local environment, the system comprising a processor configured to execute instructions that, when executed on the processor, cause the processor to: collect training data; train a common deep learning model using the collected training data; customize the deep learning model based on characteristics specific to one of a plurality of local devices utilizing transfer learning; and deploy the customized deep learning model to the one of the plurality of local devices. The system may comprise a data processing device in a cloud environment and the plurality of local devices may comprise edge devices. The customized deep learning model may be trained across a hierarchy comprising: a central common model trained on data from all devices in the plurality of devices; a location based model trained on a first set of data from devices in the plurality of devices within a location proximity; and a device based model trained on a data from one device in the plurality of devices. The training data may be collected from the plurality of local devices; and the customization may be based at least in part on data collected from the one of the plurality of local devices.

According to one or more embodiments, a computer program product for adapting a deep learning model to a local environment, the computer program product comprising a computer readable storage medium having program code embodied therewith, the program code executable by one or more processors, to perform a method comprising: collecting training data; training a common deep learning model using the collected training data; customizing the deep learning model based on characteristics specific to one of a plurality of local devices utilizing transfer learning; and deploying the customized deep learning model to the one of the plurality of local devices. The customized deep learning model may be trained across a hierarchy comprising: a central common model trained on data from all devices in the plurality of devices; a location based model trained on a first set of data from devices in the plurality of devices within a location proximity; and a device based model trained on a data from one device in the plurality of devices. The method may further comprise: initializing a machine learning model having a plurality of hidden layers; training the machine learning model using the second set of data records; locking a first set of layers in the plurality of hidden layers; and retraining the machine learning model using the first set of data records.

Additional features and advantages are realized through the techniques disclosed herein. Other embodiments and aspects are described in detail herein. Refer to the description below and to the drawings for the various features and aspects disclosed herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following definitions may be used below.
Application service provider (ASP): An entity that provides access to an application used by an end user.

End user: A consumer or producer of data (e.g., an individual, application, or organization) that is produced by or utilized by another application and/or organization.

Networked service provider (NSP): An entity that provides access to an application that is not entirely local to an end-user's device. An NSP may provide networking infrastructure, such as an Internet service provider (ISP), and/or a processing platform infrastructure, such as a cloud services provider, or any other communication service provider.

Edge device: a computation device that enables an end user to connect and transfer data to a network, such as to a local area network (LAN), an external wide area network (WAN), service provider core network, and/or the Internet. Examples include pervasive devices (e.g., smart phones), smart devices (e.g., smart speakers), Internet of Things (IoT) devices, embedded processors in a vehicle, a content delivery network server logically closer to the end user than a central server, routers, routing switches, and the like.

Artificial intelligence (AI) systems generally use trained models to perform a task. Those models are based on inferences or predictions made from a given input value, and may be trained using supervised learning techniques, in which a training data set includes a plurality of labeled data points; semi-supervised learning techniques, in which the training data set includes a subset of labeled data points and a subset of unlabeled data points which are used to refine the predictions generated by the trained machine learning model; or unsupervised learning techniques, in which the training data set includes unlabeled data points, and the machine learning model is trained to identify similarities or differences between data points in the training data set. Typically, the resulting machine learning models are developed to perform a variety of tasks, such as data classification or categorization, subject recognition in images, generating content recommendations to a user of an application or website, autonomous control of motor vehicles, text recognition, and the like.

Training machine learning models is often a computationally expensive process that may involve the use of large training sets of data to develop weightings and other values used in the trained machine learning models to perform a given task. For example, a typical training data set may include gigabytes or terabytes of data and involve the use of many general-purpose computing systems in a server farm and/or specialized processors for performing machine learning (or deep learning or artificial intelligence) tasks. These specialized processors may include, for example, massively parallel coprocessing systems, graphical processing units (GPUs), tensor processors, or other types of processors that may be used to quickly process large data sets. As a result, training machine learning models on a single computing device (e.g., a workstation) or a small number of computing devices has historically often been impractical.

One or more embodiments disclosed herein may facilitate training a central deep learning model based on a given data set, and then customizing that trained deep learning model for the edge using transfer learning and data collected from the edge. Embodiments may also include deploying the customized models to that edge environment, such as an end user's device, vehicle, or a content distributed network (CDN) node.

Cloud Computing

Figure 1:
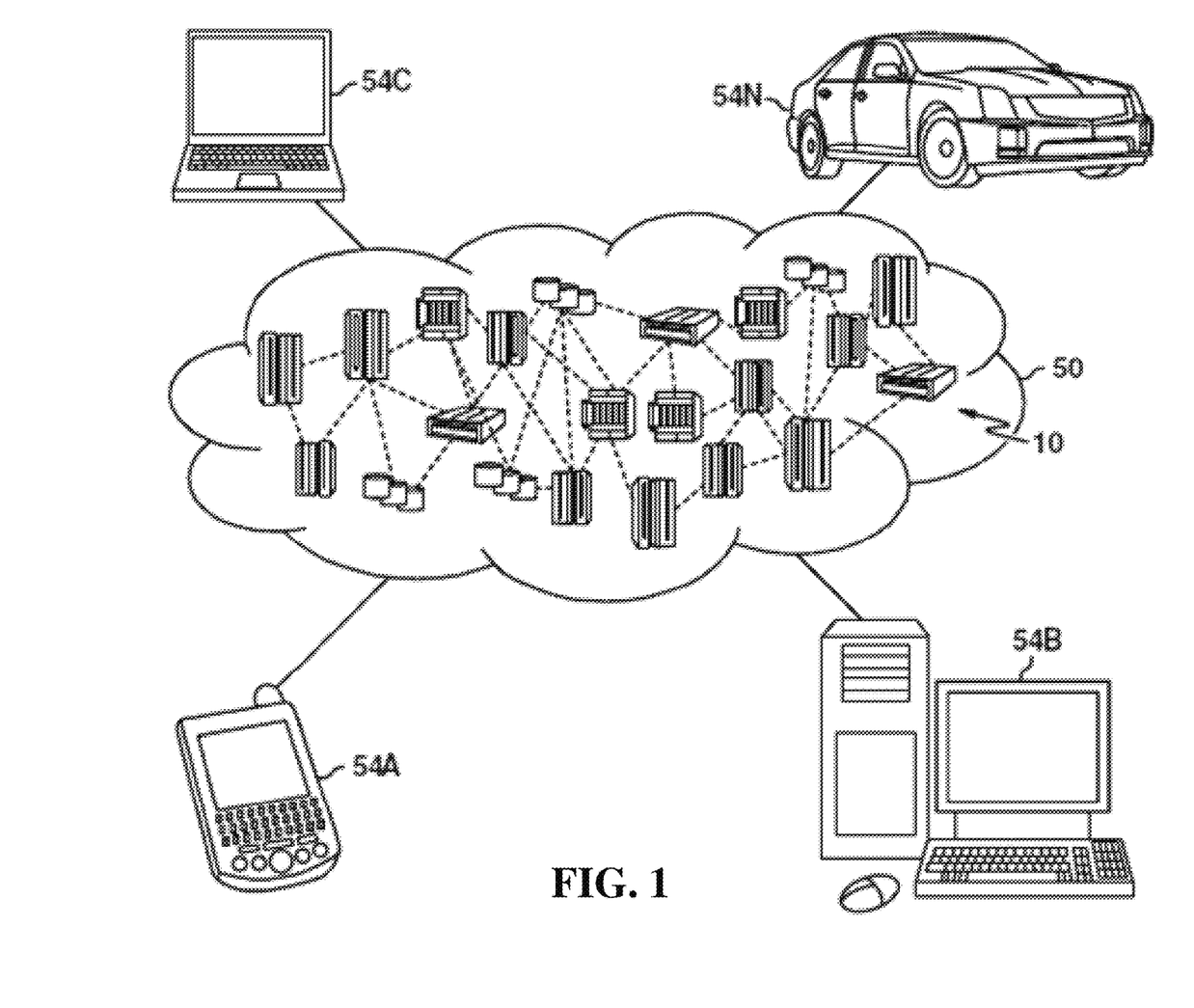
FIG. 1 depicts a cloud computing environment according to some embodiments.

FIG. 1 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
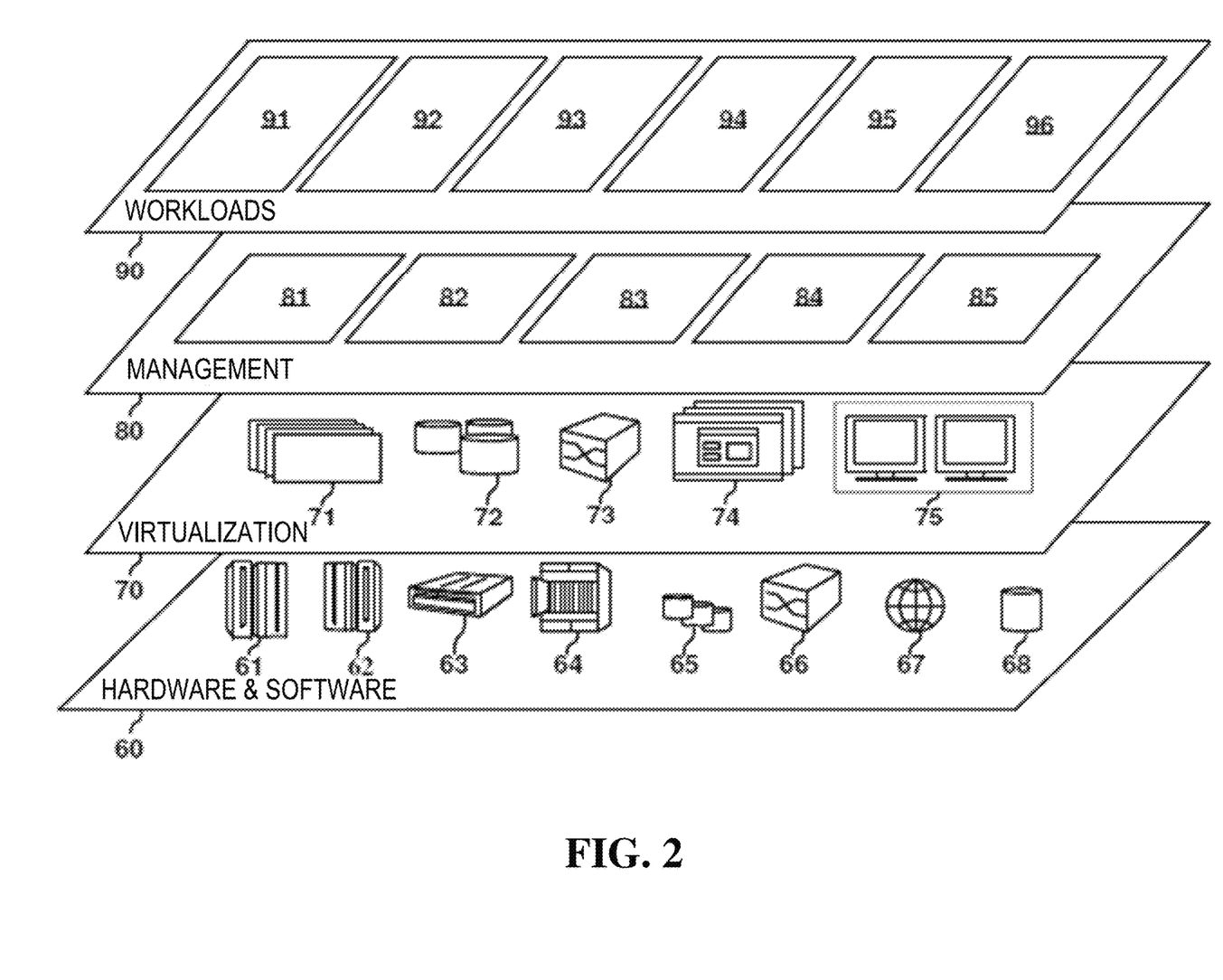
FIG. 2 depicts abstraction model layers according to some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transfer learning module 96.

Data Processing System

Figure 3:
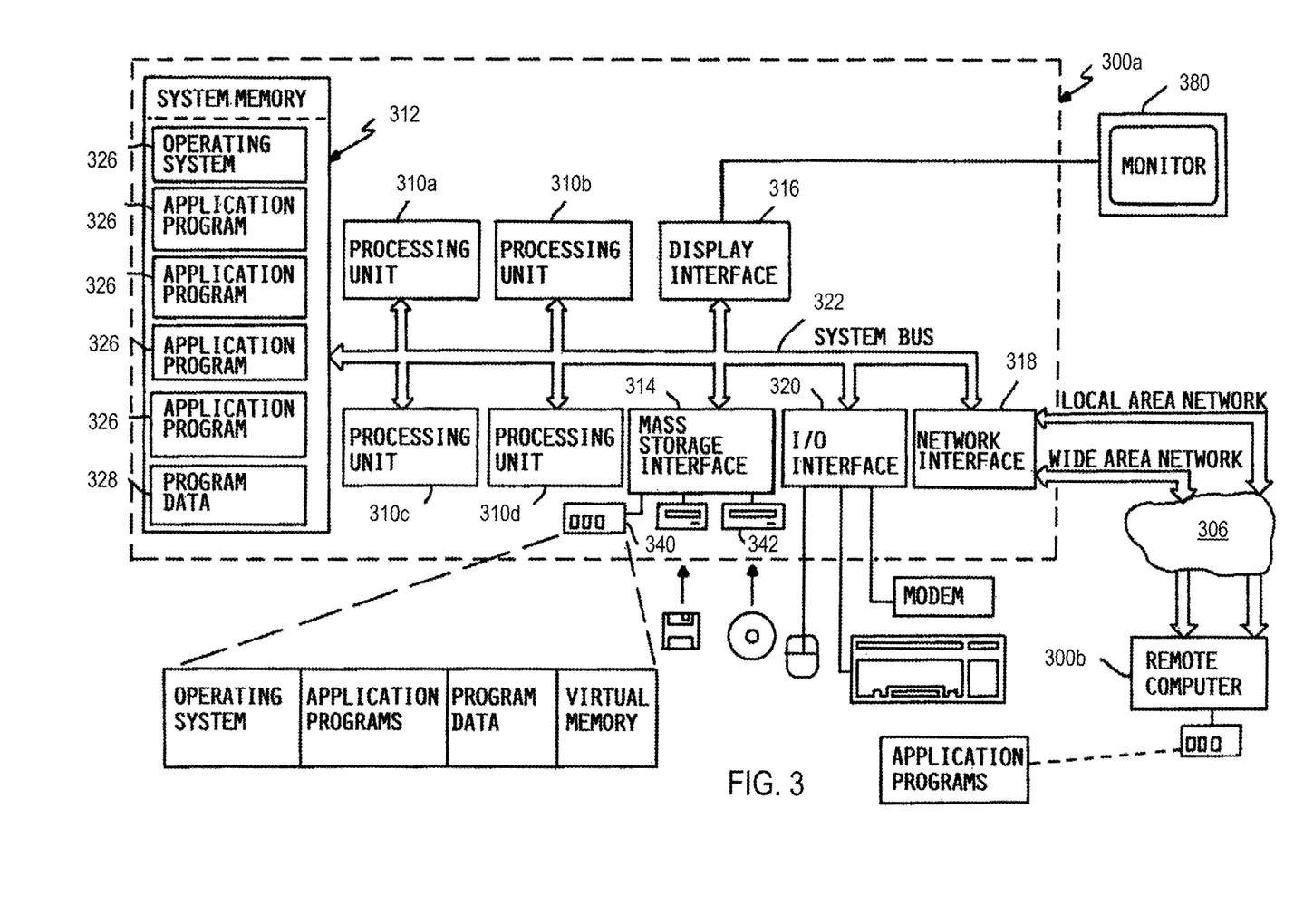
FIG. 3 is a block diagram of a data processing system (DPS) according to one or more embodiments disclosed herein.

FIG. 3 illustrates one embodiment of a data processing system (DPS) 300a, 300b (collectively, DPS 300) suitable for use in an edge enabled, scalable, and dynamic transfer learning mechanism, such as one of the cloud computing nodes 10 described with reference to FIGS. 1 and 2. FIG. 3 only depicts the representative major components of the DPS 300 and that individual components may have greater complexity than represented in FIG. 3. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary.

The data processing system 300 in FIG. 3 comprises a plurality of central processing units 310 a-310 d (herein generically referred to as a processor 310 or a CPU 310) connected to a main memory unit 312, a mass storage interface 314, a terminal/display interface 316, a network interface 318, and an input/output ("I/O") interface 320 by a system bus 322. The mass storage interfaces 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The main memory unit 312 also contains an operating system 324, a plurality of application programs 326, and program data 328.

The data processing system 300 embodiment in FIG. 3 is a general-purpose computing device. Accordingly, the processor's 310 may be any device capable of executing program instructions stored in the main memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processor's 310 may be implemented using a number of heterogeneous data processing systems 300 in which a main processor 310 is present with secondary processors on a single chip. As another illustrative example, the processor unit 304 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the main memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices, which are in communication with the processor's 310 through the system bus 322. The program code in the different embodiments may be embodied on different physical or tangible computer readable media, such as the memory 312 or the mass storage devices. In the illustrative example in FIG. 3, the instructions are stored in a functional form of persistent storage on the direct access storage device 340. These instructions are then loaded into the main memory 312 for execution by the processor 310. However, the program code may also be located in a functional form on the computer readable media 342 that is selectively removable and may be loaded onto or transferred to the DPS 300 for execution by the processor unit 310.

With continuing reference to FIG. 3, the system bus 322 may be any device that facilitates communication between and among the processors 310; the main memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The main memory 312 and the mass storage devices 340 work cooperatively to store the operating system 324, the application programs 126, and the program data 328. In this embodiment, the main memory 312 is a random-access semiconductor device capable of storing data and programs. Although FIG. 3 conceptually depicts that device as a single monolithic entity, the main memory 312 in some embodiments may be a more complex arrangement, such as a hierarchy of caches and other memory devices. For example, the main memory 312 may exist in multiple levels of caches, and these caches may be further divided by function, so that one cache holds instructions while another holds non-instruction data, which is used by the processor or processors.

Main memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the main memory 312 and the mass storage device 340.

Although the operating system 324, the application programs 326, and the program data 328 are illustrated as being contained within the main memory 312, some or all of them may be physically located on different computer systems and may be accessed remotely, e.g., via the network 306, in some embodiments. Thus, while the operating system 324, the application programs 326, and the program data 328 are illustrated as being contained within the main memory 312, these elements are not necessarily all completely contained in the same physical device at the same time, and may even reside in the virtual memory of other DPS 300.

The system interface units 314, 316, 318, 320 support communication with a variety of storage and I/O devices. The mass storage interface unit 314 supports the attachment of one or more mass storage devices 340, which are typically rotating magnetic disk drive storage devices, a solid-state storage device (SSD) that uses integrated circuit assemblies as memory to store data persistently, typically using flash memory, or a combination of the two. However, the mass storage devices 340 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices and the like.

The terminal/display interface 316 is used to directly connect one or more display units 380 to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more displays 380, the computer systems 300 does not necessarily require a display 380 because all needed interaction with users and other processes may occur via network interface 318.

The network 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra Wide Band ("UWB") technology, such as that described in FCC 02-48; or the like. Those skilled in the art will appreciate that many different network and transport protocols can be used to implement the communication medium 306. The Transmission Control Protocol/Internet Protocol ("TCP/IP") suite contains suitable network and transport protocols.

One exemplary data processing system 300 is an eServer iSeries computer running the i5/OS multitasking operating system, both of which are produced by International Business Machines Corporation of Armonk, N.Y. Another exemplary data processing system 300 is a personal computer running the Linux or Windows operating systems. However, the methods, systems, and apparatuses in this disclosure apply equally to any data processing system 300 and operating system combination, regardless of whether one or both of the DPS 300 are complicated multi user computing apparatuses, a single workstations, lap-top computers, mobile telephones, personal digital assistants ("PDAs"), video game systems, or the like.

Network Services Provider

Figure 4:
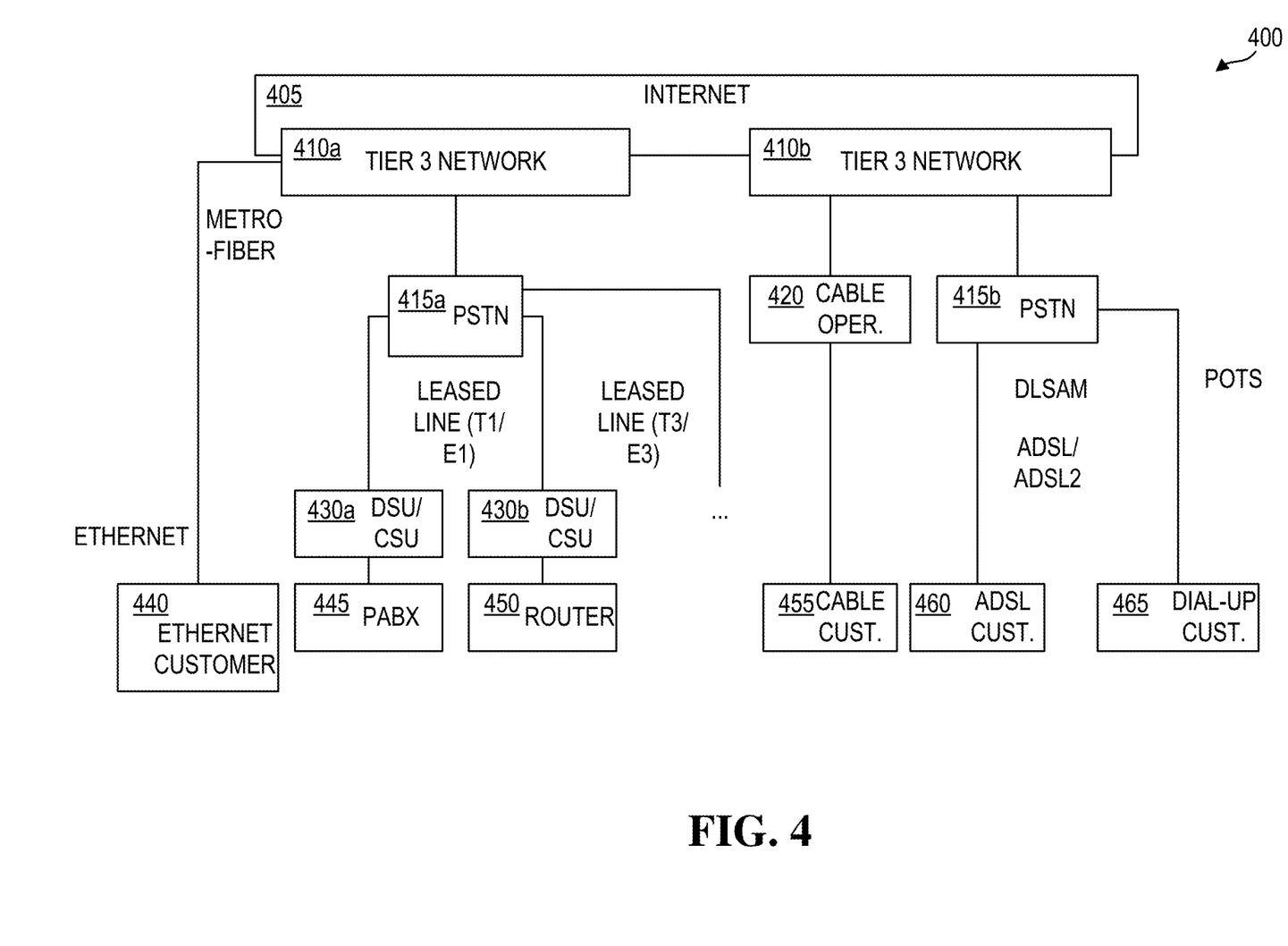
FIG. 4 is a block diagram of an example internet service provider (ISP) system as an example of a network services provider (NSP) system according to one or more embodiments disclosed herein.

FIG. 4 is a block diagram illustrating an example Network Services Provider (NSP) system 400. The example NSP shown is an ISP. An NSP is an entity that provides services for accessing and using a network. For an ISP, such services may include Internet access, Internet transit, domain name registration, web hosting, Usenet service, and colocation, and the ISP may be classified as a Tier 1, Tier 2, and/or Tier 3 service provider. Tier 1 service providers own a networks that do not purchase transit service from any other network, and therefore typically 'peers' with every other Tier 1 network to maintain global reachability. Tier 1 service providers typically are the biggest providers geographically, but are not always the biggest in terms of the number of customers. Tier 2 service providers provide a network with transit connections, customers, and some peering, but they buy transit services from Tier 1 service providers to reach some portions of the Internet. Tier 3 service providers typically do not have any transit customers nor peering relationships. They generally purchase transit Internet connections from Tier 2 service providers and sometimes from the Tier 1 service providers.

FIG. 4 shows the Internet 405 connecting two Tier 3 networks 410a, 410b that deliver the last mile of Internet access to businesses and residential homes. Tier 3 service providers are presumed to strictly purchase Internet transit. They incorporate in their pricing structure Tier 2 and Tier 1 network services that may be needed to transport the data around the world. A metro fiber is an optic fiber connecting multiple ethernet-based customers 440 in a metropolitan area and provides a high-speed broadband connection.

The NSP may also comprise a public switched telephone network (PSTN) 415a connected to the tier 3 network 410a that may connect to a data service unit/channel service unit 430a, 430b to their users through leased lines (T1/E1, T3/E3). Connection to the end user may be via a PABX 445 or via a router 450. In addition, a tier 3 network 410b may utilize a PSTN 415b for an asymmetric digital subscriber line (ADSL) customer 460 via a digital subscriber line access multiplexer for ASDL. Dial-up customers 465 may be connected to the PSTN via a plain old telephone system (POTS). It also may provide a connection to a cable customer 455 who obtains cable services from a cable operator 420.

Model Training

The machine learning models ("ML models") in some embodiments may be any software system that recognizes patterns. In some embodiments, the ML models comprise a plurality of artificial neurons interconnected through connection points called synapses. Each synapse encodes a strength of the connection between the output of one neuron and the input of another. The output of each neuron, in turn, is determined by the aggregate input received from other neurons that are connected to it, and thus by the outputs of these "upstream" connected neurons and the strength of the connections as determined by the synaptic weights.

The ML models are trained to solve a specific problem (e.g., speech recognition) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. The layer that receives external data is the input layer. The layer that produces the ultimate result is the output layer. Same embodiments include hidden layers between the input and output layers, and commonly hundreds of such hidden layers.

Figure 5:
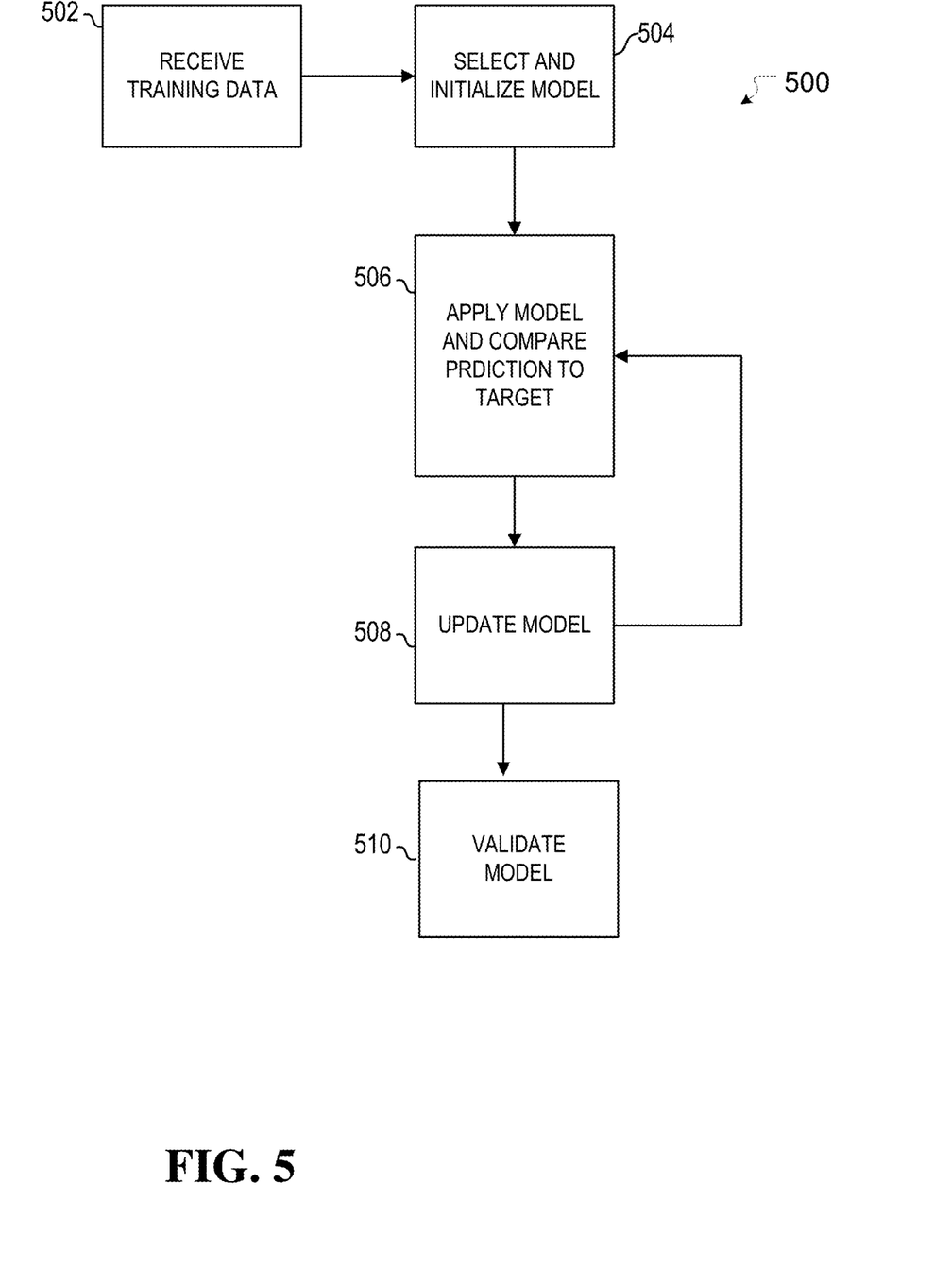
FIG. 5 is a block diagram of an example machine learning (ML) model training method according to one or more embodiments disclosed herein.

Referring now to FIG. 5, one embodiment of a ML model training method 500 is depicted, described with reference to speech recognition as an illustrative example. At block 502, the system receives training data. In this example, the input dataset may include recorded television audio and the target dataset may include manually transcribed close caption data. At block 504, the training data is prepared to reduce sources of bias, typically including de-duplication, normalization, and order randomization. At block 504, a model is chosen for training and the initial synaptic weights are randomized. Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At block 506, the selected model is used to predict an output using the input data element, and that prediction is compared to the corresponding target data. The error (e.g., difference between the predicted value and the target value) is then used at block 508 to update the synaptic weights. This process repeats, with each iteration updating the weights, until the training data is exhausted, or the model reaches an acceptable level of accuracy and/or precision. At block 510, the resulting model may optionally be compared to previously unevaluated data to validate and test its performance.

Transfer Learning

Figure 6:
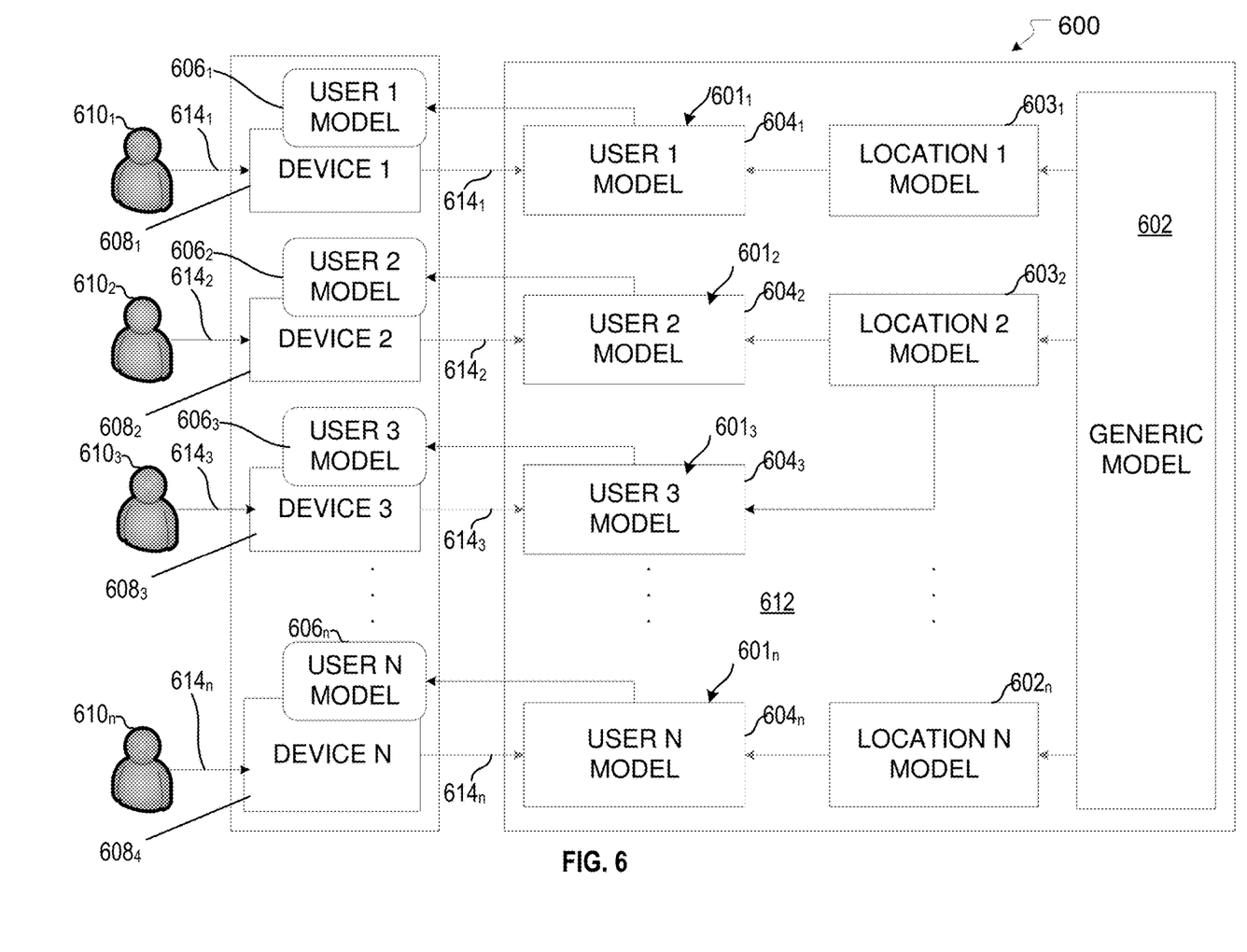
FIG. 6 depicts an example transfer learning system according to one or more embodiments disclosed herein.

FIG. 6 illustrates one embodiment of a transfer learning system 600. Reference numbers representing one of a plurality of elements may use subscripts. Use of the reference number without a subscript may refer to the plurality as a whole or to an example member of the plurality. This transfer learning system 600 embodiment comprises a machine learning model $601_{1-n}$ customized for each of a plurality of end users $610_{1-n}$. This machine learning (ML) model 601 embodiment, in turn, may comprise a generic ML model 602, a plurality of location-customized ML models 603, and a plurality of user-customized ML models 604. This machine learning model 601 embodiment may be used to create a plurality of local ML models $606_{1-n}$ for each user 610, which are adapted to execute upon an edge device $608_{1-n}$ typically owned or rented by one of a plurality of end users $610_{1-n}$. The end users 610, in turn, generate end user data $614_{1-n}$ by interacting with their associated edge device $608_{1-n}$, and that end user data $614_{1-n}$ may be utilized to tune the machine learning model 601. The generic ML model 602, the location models $603_{1-n}$, and the user models $604_{1-n}$ in this embodiment are located on data processing devices that are part of a cloud environment 612, separate from the edge devices 608$_{1-n}$, such as the DPS 300 described with reference to FIG. 3.

The machine learning model 601 in this embodiment may be comprised of many hundreds (e.g., 500-700) hidden layers. The generic ML model 602 subcomponent may comprise a supermajority of those hidden layers (e.g., 70%-90%) and may be initially trained using data subset X (see FIG. 7 description) and the ML model training method 500 to optimize performance over a wide variety of phenomena, such as different vocal tones, accents, dialects, and speech patterns in the illustrative speech-recognition example above. Because training a ML model 601 with many layers is a computationally expensive process, the generic ML model 602 is typically retrained and/or tuned only periodically, such as every month or week. However, some embodiments may use a recency factor of model to determine the refresh frequency, or may specify specific events to dictate when the model will be retuned (e.g., a company launches a product in a new market or if feedback scores decline below a threshold). Additionally, some embodiments may start with randomized synaptic weights for the initial generic ML model 602, while other embodiments may start with a pretrained model that has been previously trained on a generic large dataset, and then customize that model further based on collected data.

The location models 603$_{1-n}$ in this embodiment may comprise another subset of the hidden layers (e.g., 10%-20%) in the machine learning model 601. The location models 603$_{1-n}$ are created by first locking the layers of the transfer learning system 600 associated with the generic ML model 602 and then re-tuning the system 600 using the ML model training method 500 and the central model data subset X tagged (i.e., associated) with a particular location of a subset of the edge devices 608. In this way, the synaptic weights of the unlocked hidden layers adjust to minimize the cost function with respect to the subset of the data X associated with the selected location, without altering the weights of the generic ML model 602, and thus, without incurring the full cost of retuning the full ML models 601$_{1-n}$ or the generic ML model 602. Continuing the speech recognition example, a subset of the total layers (e.g., 10-15%) of the learning system 600 may be utilized for the location models 603$_{1-n}$ and the combined system may be optimized for dialects associated with the selected location, such as American English vs. British English. The granularity of the location models 603$n$ may be decided based on individual model's requirement. For example, if a model is only dependent on language of a location, then the location granularity can be a country/region, whereas if a model needs weather, the location granularity can be few square miles. The location models 603$_{1-n}$ will typically be recreated more frequently than the generic ML model 602, such as every day or week, but can also be on the same refresh schedule as the generic ML model 602 and/or may use the recency factor of model.

The user models 604$_{1-n}$ in this embodiment comprise yet another subset of the hidden layers (e.g., 10%-20%) in the ML model 601. The user models 604$_{1-n}$ may be created by first locking the layers of the transfer learning system 600 associated with the generic ML model 602 and the location models 603$_{1-n}$, and then re-tuning the system 600 using the transfer learning data subset Y (see FIG. 7 description) and the ML model training method 500. In this way, the synaptic weights of the unlocked hidden layers adjust to minimize the cost function with respect to the subset of the data Y, without altering the weights of the generic ML model 602 or location models 603$_{1-n}$, and without incurring the full cost of retuning the full models 601$_{1-n}$, the generic ML model 602, and/or the location models 603$_{1-n}$.

In this embodiment, new local models 606$_{1-n}$ are created and pushed to the edge devices 608$_{1-n}$ frequently, such as every hour, day, or week; based on events, such as when the associated end user's 610$_{1-n}$ location changes, in response to new user data 614$_{1-n}$, or a combination thereof. Additionally, the refresh frequency in some embodiments can be configured based on the device's 608$n$ available hardware resources and/or on the recency factor of model. Similarly, the end user data 614$_{1-n}$ may be pushed from the user devices 608$_{1-n}$ on the edge to the cloud environment 612 frequently, such as every hour, day, or week. In some embodiments, this push frequency may also be configured based on the device's 608$_{1-n}$ hardware resources, the recency factor of model, and/or timed for efficient operation of the cloud environment 612.

The local models 606 in this embodiment are created from the trained ML model 601. That is, the local models 606 are created using all of the layers in the generic ML model 602, the location model 603$n$ associated with the end user 610$_{1-n}$ and the user model 606$n$ associated with the end user 610$_{1-n}$. The local models 606$_{1-n}$ may then be applied on-demand to the latest user data 614$n$ collected by the device 608$n$ to categorize the modeled phenomena.

One feature and advantage of the embodiment in FIG. 6 is that it provides a dynamic and scalable method for multi-level machine learning model training, which captures the impact of the unique characteristics of edge devices 608$_{1-n}$ and which can aggregate other edge parameters (e.g., based on behavior, location, etc.). Another feature and advantage of the embodiment in FIG. 6 is that the ML model 601 is trained but then customized versions of that ML model 601$_{1-n}$, are trained and deployed to the edge devices 608$_{1-n}$, with the help of transfer learning for producing better performance with respect to a particular individual 610$_{1-n}$, or device 608$_{1-n}$ (e.g., in transcribing speech from a user 610$_{1-n}$, with an accent). In this way, the embodiment in FIG. 6 provides a method for using transfer learning to customize a ML model deployed at the edge device 608$_{1-n}$, based on characteristics collected from the device 608$_{1-n}$. Conventional models for speech recognition, in contrast, involve training deep learning models based on a large dataset collected from a broad set of end users 610. The resulting models often suffer from poor results when applied to individual cases.

Another feature and advantage of the embodiment in FIG. 6 is a customized ML model 601$_{1-n}$, for the edge that provide better performance and end user experience as the customized models 601$_{1-n}$, are better tuned to the user's environment. For example, the end user models 606 in this embodiment can be always kept up-to-date based on the end user's location and latest activity data 614$_{1-n}$. This transfer learning system embodiment 600 is also be highly scalable as the individual user models can be built at end user 610$_{1-n}$, level granularity. Additionally, this transfer learning system embodiment 600 imposes relatively low resource overhead on the edge devices 608$_{1-n}$ without losing context based on the end user's 610$_{1-n}$ recent activities and location 614$_{1-n}$.

Another feature and advantage of the embodiment in FIG. 6 is that it is adapted for edge computing. Edge computing assists real-time applications in processing and analyzing data collected from various sensors and connected devices, at the edge of the network. Edge computing also helps reduce latency, and thereby, provides a faster response to the critical applications. That is, the data 614 transmitted from the sensors and devices is stored and processed on the edge of the network, close to the devices 608, instead of transferring it to the cloud or data centers located miles away from the edge devices 608. Yet another feature and advantage, especially considering the context of deep learning, is that generally applicable models that solve broad, complex problems need vast amounts of labeled data, and getting that labeled data can be difficult, particularly considering the time and effort it takes to label data points. The embodiment in FIG. 6, with its layered approach, allows for individually tuned models directed to small groups of users.

The speech recognition example provide above is only one example for the deep learning model in operation, and other use cases are consistent with the present disclosure. Similarly, various domain data or various industry data may be used as datasets for identifying feature importance. For example, one alternate use case may be a configurationless personal assistant. The embodiment in FIG. 6 can be extended to other aspects depending on the demand of actual model scenarios. For example, there may be scenarios when the system 600 does not have enough user data $614_{1-n}$ collected for a given edge device $608_{1-n}$. In that case, this embodiment 600 could use a combination of training data from the "M" nearest neighbors to the edge device $608_{1-n}$ in question. The M nearest neighbors, in turn, can be based on a variety of factors depending on the application, such as physical proximity and/or on other metrics of proximity as appropriate for the particular model. For example, in the case of image classification, the M neighbors can be obtained by identifying friends and family members who most likely share similar images.

Transfer Learning Processes

Figure 7:
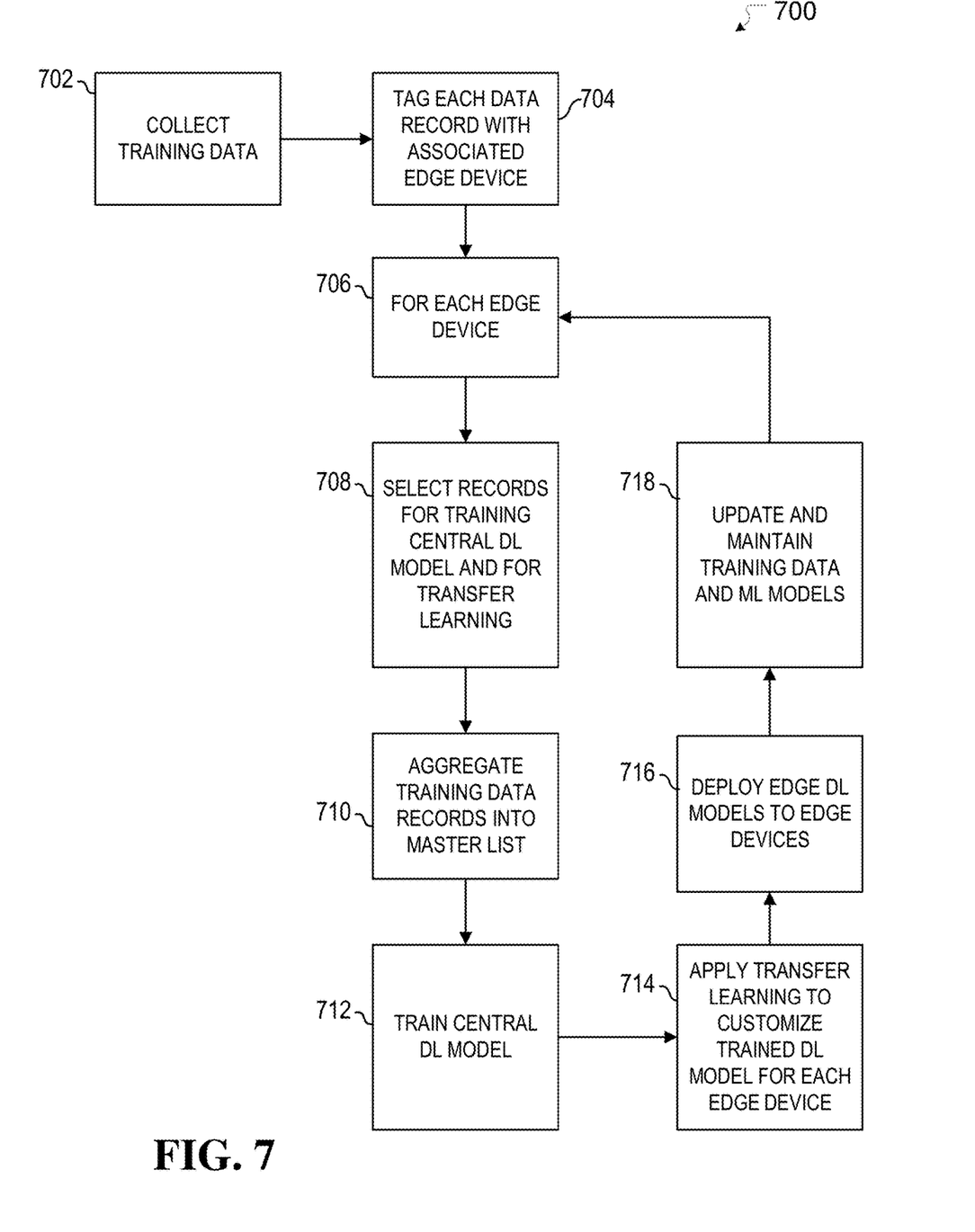
FIG. 7 is a block diagram of an example transfer learning method according to one or more embodiments disclosed herein.

FIG. 7 illustrates some embodiments of a transfer learning method 700. At block 702, data is collected for use for training. In these embodiments, we have N data records, where each record consists of input data and a corresponding label. For example, the input data can represent pixels of an image and the label can be "dog" or "cat." At block 704, for each data record $d_i$ (for i in 1-N), tag $d_i$ with the edge device 608 to which it is associated. For purposes of these embodiments 700, we assume there are "K" edge devices 608. At block 706, for each edge device 608, let Dk be the set of data records associated with that edge device 608. At block 708, randomly select X % of the data records in $D_k$ to use for training the generic model 602 (X data subset), randomly select Y % to use for transfer learning purposes (Y data subset), and randomly select Z % to be used for validation and blind-testing (Z data subset). For example, select X to be 65%, Y to be 10% and Z % to be 10%; this means that 65% of the training data associated with edge device $608k$ are used for training the generic model 602, 10% are used for purposes of transfer learning, and 15% is used for validation and blind-test purposes.

At block 710, the method aggregates all the training data records into a master list of training data records, $D_{training}$. That is, $D_{training}$ in this embodiment is the union of $D_k$ for all edge devices $608_k$. At block 712, the method selects the central deep learning model, $DL_{central}$, that is best suited for the use case and then train the ML model 601 using the X % records. At block 714, the method applies the transfer learning technique described above to customize the trained model 601 for each of the edge devices 608 by using the Y % reserved earlier for that purpose. In one embodiment, this may be done by locking some of the hidden layers in the ML model 601 associated with the generic ML model 602 and then retraining the ML model 601 using the Y % records. This block will result in "K" customized deep learning models, one for each edge device 608. At block 716, the method deploys the trained edge deep learning models $306n$ to the edge devices $608n$. At block 720, the method updates and maintains the training data and ML models 601 following standard data science best practices and guidelines.

Figure 8:
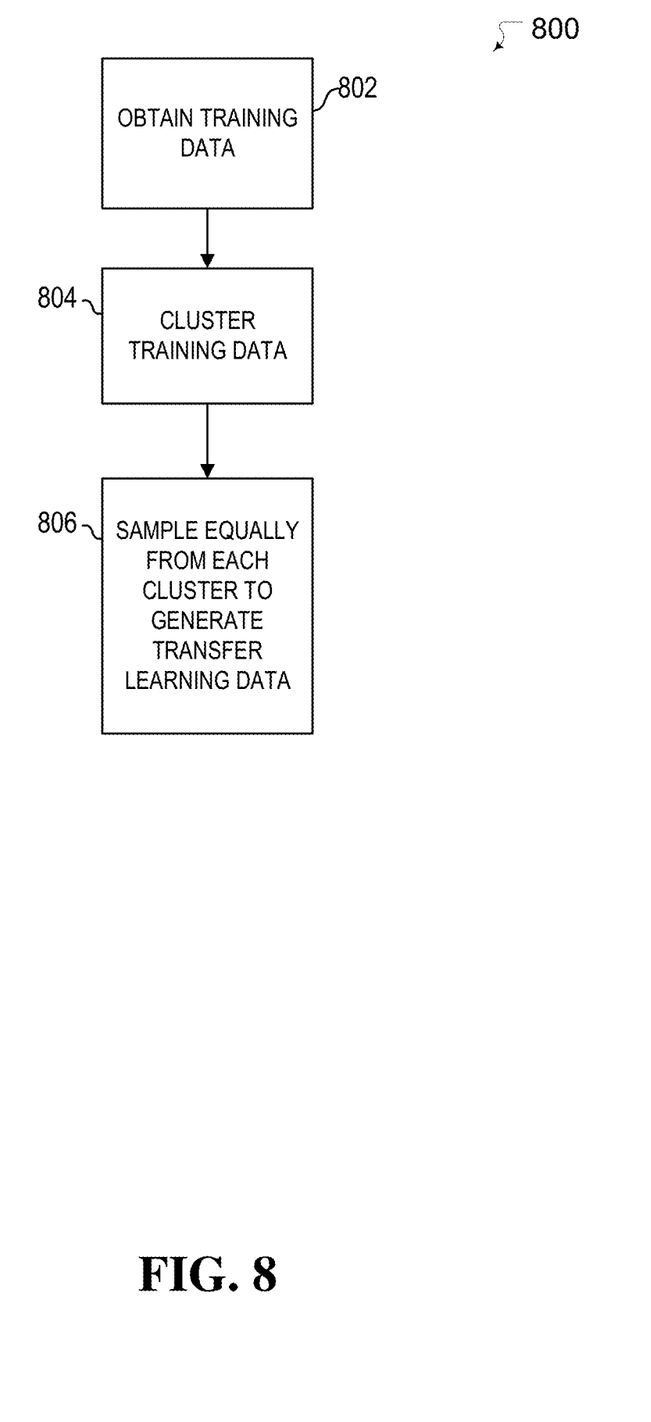
FIG. 8 is an alternate embodiment of a method for selecting data records according to one or more embodiments disclosed herein.

FIG. 8 illustrates an alternate embodiment 800 of the method for selecting data records for transfer learning described with reference to blocks 708-710. At block 802, the end user data 614 obtained from all of the edge devices $612n$ is grouped into N clusters using a clustering algorithm, such as K-means, CLIQUE, SUBCLU, HiSC, DiSH, etc. At block 804, equal samples from each cluster are taken to collect the Y % of data records. At block 806, the Y % collected data is used for transfer learning and the remaining X % is used for training the central model. In this way, this embodiment may be trained and customized across a hierarchy such that the central machine learning model 601 is trained on a collection of data from all the devices served, the location-based models $604_{1-n}$ are trained on data clusters from devices within a location proximity, and the user-based models 604 are trained on data from individual devices Computer Program Product Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Service Model

Embodiments of the present invention may also be delivered as part of a service engagement with a client corporation, nonprofit organization, government entity, internal organizational structure, or the like. Aspects of these embodiments may include configuring a computer system to perform, and deploying software and web services that implement, some or all of the methods described herein. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for use of the systems. This service engagement may be directed at providing both the cloud services and the cloud controller services, may be limited to only providing cloud controller services, or some combination thereof. Accordingly, these embodiments may further comprise receiving billing information from other entities and associating that billing information with end users of the cloud.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

We claim:

1. A computer-based method for adapting a deep learning model to a local environment comprising:
    collecting training data;
    training a common deep learning model using the collected training data;
    generating a plurality of customized deep learning models from the common deep learning model based on a current location of and on characteristics specific to respective ones of a plurality of local devices utilizing transfer learning;
    training a first customized deep learning model of the plurality of customized deep learning models, based on the common deep learning model and a set of training data records for a first edge server, wherein the set of training data records are randomly selected from a set of data records associated with the first edge server; and
    deploying the plurality of customized deep learning models to the respective ones of the plurality of local devices, wherein the first customized deep learning model is deployed to the first edge server.

2. The method of claim 1, further comprising:
    randomly selecting from the training data, a first set of data records for training a generic deep learning model; and
    randomly selecting from the training data, a second set of data records for the transfer learning.

3. The method of claim 2, further comprising:
    training the generic deep learning model using the first set of data records;
    for each of a plurality of local devices, training a customized deep learning model using the second set of data records utilizing transfer learning; and
    deploying one of the plurality of customized deep learning models to each the plurality of local devices.

4. The method of claim 2, further comprising:
    training the common deep learning model using the first set of data records;
    combining the second set of records associated with a set of local devices in the plurality of local devices; and
    training a second customized deep learning model using a plurality of the second set of records associated with the set of the local devices utilizing transfer learning; and
    deploying the second customized deep learning model to each device in the set of local devices.

5. The method of claim 2, wherein the transfer learning comprises:
    initializing a machine learning model having a plurality of hidden layers;
    training the machine learning model using the second set of data records;
    locking a first set of layers in the plurality of hidden layers; and
    retraining the machine learning model using the first set of data records.

6. The method of claim 1, further comprising:
    identifying factors needed to tune the common deep learning model for the one of the plurality of local devices;
    tagging data records in the training data with the identified factors; and
    training the customized deep learning model based on the tagged data records utilizing transfer learning.

7. The method of claim 1, further comprising:
    clustering the collected training data into a plurality of clusters;
    equally sampling from each cluster to collect a first set of data records;
    customizing the deep learning model based on characteristics of the first set of data records utilizing transfer learning; and
    training the common deep learning model using a second set of data records.

8. The method of claim 1, wherein the local device comprises an edge device; and the method further comprising:
    applying the customized deep learning model at the edge device to categorize phenomena; and
    detecting a change in a current location of the edge device, and in response:
        re-generating one of the plurality of customized deep learning models based on the detected change in the current location of the edge device; and
        deploying the re-generated one of the plurality of customized deep learning models to the edge device.

9. The method of claim 1, wherein the customized deep learning model is trained across a hierarchy comprising:
    a central common model trained on data from all devices in the plurality of devices;
    a location-based model trained on a first set of data from devices in the plurality of devices within a location proximity; and
    a device-based model trained on a data from one device in the plurality of devices.

10. The method of claim 1, wherein:
    the training data is collected from the plurality of local devices;
    the common deep learning model comprises a model previously trained on a generic dataset,
    and wherein generating the plurality of customized deep learning models comprises:
        customizing the common deep learning model based at least in part on data collected from the respective ones of the plurality of local devices.

11. A computer system for adapting a deep learning model to a local environment, the system comprising a processor configured to execute instructions that, when executed on the processor, cause the processor to:
    collect training data;

train a common deep learning model using the collected training data;
generate a plurality of customized deep learning models from the common deep learning model based on a current location of and on characteristics specific to respective ones of a plurality of local devices utilizing transfer learning;
train a first customized deep learning model of the plurality of customized deep learning models, based on the common deep learning model and a set of training data records for a first edge server, wherein the set of training data records are randomly selected from a set of data records associated the first edge server; and
deploy the plurality of customized deep learning models to the respective ones of the plurality of local devices, wherein the first customized deep learning model is deployed to the first edge server.

12. The system of claim 11, wherein the system comprises a data processing device in a cloud environment and wherein the plurality of local devices comprise edge devices.

13. The system of claim 11, further comprising instructions that, when executed on the processor, cause the processor to:
randomly select from the training data a first set of data records for training a generic deep learning model; and
randomly select from the training data a second set of records for the transfer learning.

14. The system of claim 13, further comprising instructions that, when executed on the processor, cause the processor to:
train the generic deep learning model using the first set of data records;
for each of a plurality of local devices, train a second customized deep learning model using the second set of records utilizing transfer learning; and
deploy one the second customized deep learning models to each the plurality of local devices.

15. The system of claim 13, further comprising instructions that, when executed on the processor, cause the processor to:
train the common deep learning model using the first set of data records;
combine the second set of records associated a set of local devices in the plurality of local devices; and
train a second customized deep learning model using a plurality of second set of records associated with the set of the local devices utilizing transfer learning; and
deploy the second customized deep learning model to each device in the set of local devices.

16. The system of claim 13, wherein transfer learning comprises:
initializing a machine learning model having a plurality of hidden layers;
training the machine learning model using a second set of data records;
locking a first set of layers in the plurality of hidden layers; and
retraining the machine learning model using the first set of data records.

17. The system of claim 11, wherein a second customized deep learning model is trained across a hierarchy comprising:
a central common model trained on data from all devices in the plurality of devices;
a location-based model trained on a first set of data from devices in the plurality of devices within a location proximity; and
a device-based model trained on a data from one device in the plurality of devices.

18. A computer program product for adapting a deep learning model to a local environment, the computer program product comprising a computer readable storage medium having program code embodied therewith, the program code executable by one or more processors, to perform a method comprising:
collecting training data;
training a common deep learning model using the collected training data;
generating a plurality of customized deep learning models from the common deep learning model based on a current location of and on characteristics specific to respective ones of a plurality of local devices utilizing transfer learning;
training a first customized deep learning model of the plurality of customized deep learning models, based on the common deep learning model and a set of training data records for a first edge server, wherein the set of training data records are randomly selected from a set of data records associated with the first edge server; and
deploying the plurality of customized deep learning models to the respective ones of the plurality of local devices, wherein the first customized deep learning model is deployed to the first edge server.

19. The computer program product of claim 18, wherein the customized deep learning model is trained across a hierarchy comprising:
a central common model trained on data from all devices in the plurality of devices;
a location-based model trained on a first set of data from devices in the plurality of devices within a location proximity; and
a device-based model trained on a data from one device in the plurality of devices;
wherein:
the location-based model is optimized for a dialect associated with the current location;
the device-based model is generated more frequently than the location-based model; and
the location-based model is generated more frequently than the central common model.

20. The computer program product of claim 18, wherein the method further comprises:
initializing a machine learning model having a plurality of hidden layers;
training the machine learning model using a second set of data records;
locking a first set of layers in the plurality of hidden layers; and
retraining the machine learning model using a first set of data records.

* * * * *